May 8, 1962 W. R. MACLAY 3,034,109

APPARATUS FOR MANIFESTING INTELLIGENCE ON RECORD MEDIA

Filed Nov. 1, 1957 3 Sheets-Sheet 1

INVENTOR.
WILLIAM R. MACLAY

BY

Dewey J. Cunningham
ATTORNEY

APPARATUS FOR MANIFESTING INTELLIGENCE ON RECORD MEDIA

Filed Nov. 1, 1957 3 Sheets-Sheet 2

May 8, 1962 W. R. MACLAY 3,034,109

APPARATUS FOR MANIFESTING INTELLIGENCE ON RECORD MEDIA

Filed Nov. 1, 1957 3 Sheets-Sheet 3

United States Patent Office 3,034,109

Patented May 8, 1962

3,034,109

APPARATUS FOR MANIFESTING INTELLIGENCE ON RECORD MEDIA

William R. Maclay, Endicott, N.Y., assignor to International Business Machines Corporation, New York, N.Y., a corporation of New York Filed Nov. 1, 1957, Ser. No. 693,859

5 Claims. (Cl. 340—174.1)

The present invention relates to apparatus for manifesting intelligence on record media, and particularly to a unitary assembly which allows first and second transducer components to form a revolver having a relatively small delay interval.

In the digital computer art, much use is made of devices for receiving information and storing it until the information is required for a subsequent operation. One of the difficulties with certain types of storage devices is that once the information is received and stored, it may be some period of time before the information is capable of being read out. However, the computer may need the information prior to the time the information is again available. Such instances occur, for example, when a magnetic drum is used as the storage medium. The write head for a particular track of the drum is adapted to receive information to be stored and produce a magnetized pattern on a portion of the track. It will be seen that a particular read head associated with the same track is able to read the information only once each revolution of the drum. That is, if the computer calls for the information just after it has passed the read head, substantially a full revolution of the drum is required prior to the time the information is available. Thus, the access time of the information becomes a serious limiting factor to the operating speed of the computer.

One of the ways in which the access time is reduced is to space the read head ahead of the write head a distance equal to one or more words, or portions of words, of the information which is being stored. The information is read from the read head, amplified and supplied to the write head where it is again written on the drum. This means that the maximum time the computer must wait to read out the information is the time it takes for a point on the drum to travel from the write head to the read head. An arrangement such as this which recirculates information has been referred to in the art as a "revolver."

A limitation in prior art revolvers rests in the spacing required to prevent cross-talk between the read head and write head. That is, the relatively heavy writing currents required by the write head produce magnetic fields which are sensed by the read head unless the heads are spaced apart enough to prevent such cross-talk. The spacing used in prior art devices has been in the order of inches. Also, such prior art devices have been in the form of separate heads.

The present invention has as its primary object the provision of an improved arrangement wherein first and second transducer components of an apparatus for manifesting intelligence on a record medium may be relatively closely spaced apart without substantial cross-talk between the components.

Another object of the invention is to provide transducer apparatus comprising a record or write portion and a read portion, which portions are closely spaced apart on a unitary shoe member which is supported in spaced relation from a moving record medium by the laminar fluid boundary which adheres to the moving medium.

Another object of the present invention is to furnish an improved intelligence manifesting apparatus comprising a pair of transducer means mounted in a unitary housing, each comprising a core and associated winding, each core having a non-magnetic gap which is positioned adjacent a record medium, said cores being adjustable relative to each other so that the non-magnetic gaps thereof may be spaced apart varying distances.

Still another object of this invention is to produce intelligence manifesting apparatus as described in the paragraph immediately above in which the gaps are shielded from each other to prevent cross-talk therebetween.

A further object of the present invention is to provide an intelligence manifesting apparatus as described above in which the unitary housing is constructed of a conductive material to provide electrostatic shielding for the electrostatic energy which is radiated by the windings within the housing during voltage changes in the windings.

A still further object of this invention is to provide an intelligence manifesting apparatus as described in which the shoe supports the two core members with their non-magnetic gaps shielded from each other to prevent cross-talk therebetween.

Other objects of the invention will be pointed out in the following description and claims and illustrated in the accompanying drawings, which disclose, by way of examples, the principle of the invention and the best mode, which has been contemplated, of applying that principle.

Briefly, the present invention comprises a housing constructed of a material having good electrical conducting properties and within which there is provided first and second transducer components. Electrostatic shielding is afforded between the two transducer components by the conductive housing. A sleeve of magnetic material is provided in a fashion to surround each of the transducer components, thus providing magnetic shielding between the two components.

Each transducer component includes coil means, which are fixed relative to the housing, and a core which is supported by a parallel linkage fixed relative to the housing so that the core is movable relative to the coil means. Each core has a non-magnetic gap therein at a point which is adapted to be positioned adjacent a record medium. The cores are supported away from the record medium during the translation thereof by a shoe which is constructed of a conductive material, said shoe being supported by the laminar fluid boundary which adheres to the translating record medium. The non-magnetic gaps of the cores are positioned such that they are movable in slots in the conductive shoe, the slots having a partition therebetween which aids in preventing cross-talk between the gaps. The shoe is provided with a cutout between the slots to allow the shielding material separating the said first and second transducer components to extend closely adjacent the afore-mentioned partition. This aids further in preventing cross-talk between the said transducer components. One of the cores is fixed to the shoe while the other core is capable of being adjusted relative to the fixed core, thereby affording a variable spacing between the non-magnetic gaps of the two cores.

Figure 1:
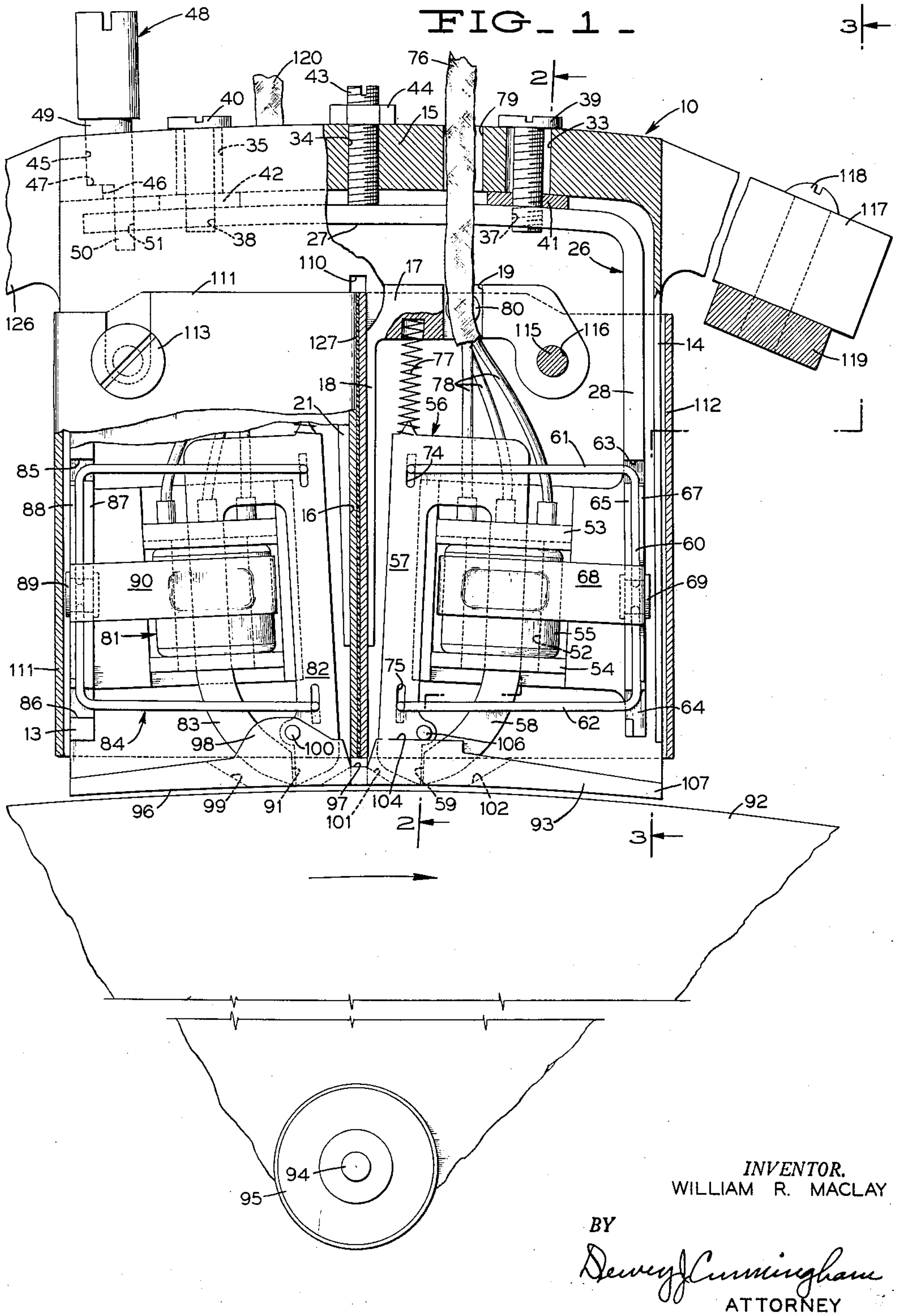
FIG. 1 is a fragmentary front view of the invention.
Figure 2:
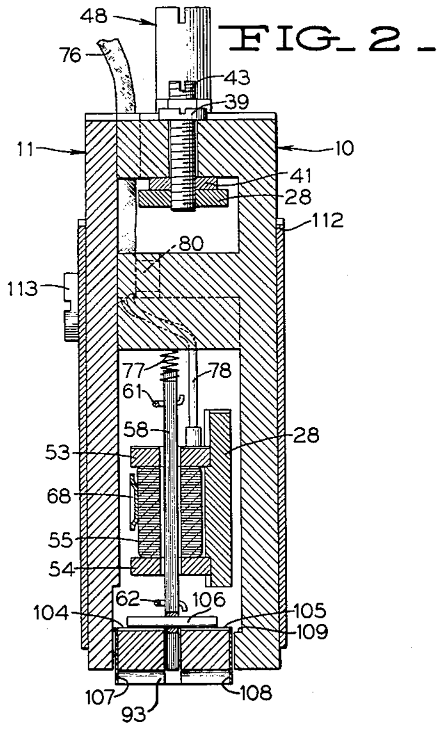
FIG. 2 is a cross-sectional view taken along lines 2—2 of FIG. 1.
Figure 6:
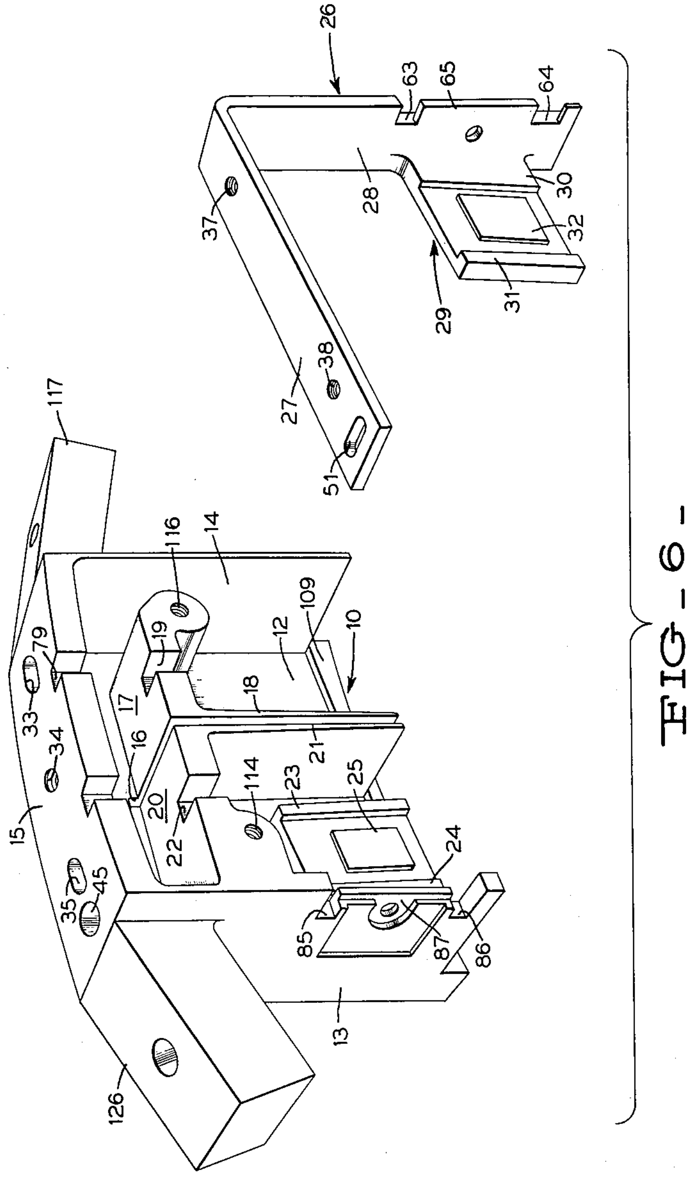
FIG. 6 is an exploded isometric view of the housing and adjusting arm with the contents thereof removed.

For a more detailed description of the invention, reference is made to FIGS. 1, 2 and 6. The housing for the two assemblies is in the form of a casting 10. As seen in FIG. 2, a front plate 11 serves as a cover for the housing.

Referring to FIG. 6, the housing comprises back side 12, left side 13, right side 14 and top side 15. A vertically extending slot 16 is provided in the back side 12, said slot being centrally positioned between sides 13 and 14 and extending from the bottom of back 12 to a point short of the top side 15.

A boss 17 and a vertically extending web 18 are provided on the back side of the housing to the right of slot 16, said boss having a slot 19 therein to accommodate the passing of wires therethrough, as will be more apparent hereinafter. To the left of slot 16, there is provided a boss 20 and a vertically extending web 21, there being a slot 22 furnished in boss 20 to also accommodate the passing of wires therethrough.

A vertically extending rib 23 is provided adjacent web 21 and a vertically extending rib 24 is provided adjacent the left side 13 of the housing. A boss 25 is formed between, but spaced from ribs 23 and 24. Ribs 23 and 24, as well as boss 25, are used to index the coil bobbin, which is to be mounted in the left half of the housing, in a manner to be explained hereinafter.

Still referring to FIG. 6, there is illustrated a generally L-shaped arm 26 which is utilized in mounting and adjusting the transducer assembly that is to fit in the right half of the housing. The arm comprises a horizontally extending portion 27 and a vertically extending portion 28. Near the lower back side of the vertically extending portion 28 there is furnished a flange 29 which projects inwardly from the said portion 28. Vertically extending ribs 30 and 31 are arranged in spaced apart relation on flange 29 and a boss 32 is provided between the ribs. Ribs 30 and 31, as well as boss 32, serve to index the coil bobbin which is to be mounted in the right half of the housing.

Referring also to FIGS. 1 and 2, the manner in which the L-shaped arm 26 fits within the back portion 10 of the housing will become apparent. The horizontal extending portion 27 of the arm 26 is adapted to fit beneath the top side 15 of the housing while the vertically extending portion 28 is adapted to lie in spaced apart relation from the right side 14 of the housing. The top side of the housing is provided with apertures 33, 34 and 35, apertures 33 and 35 being elongated along the length of the top side, as seen in FIG. 6. The horizontally extending portion of the L-shaped arm is provided with tapped apertures 37 and 38 that are adapted to be respectively aligned with the afore-mentioned apertures 33 and 35. Stud bolts 39 and 40 extend through apertures 33 and 35, respectively, and are threadingly received by the tapped apertures 37 and 38. It will be seen from FIG. 1 that spacer washers 41 and 42 prevent engagement of portion 27 of the arm with top side 15 of the housing.

Aperture 34 in the top side of the housing is tapped to threadingly receive bolt 43, this bolt being adapted to engage the portion 27 of arm 26 and to be locked in position by a lock nut 44. Bolt 43 serves as the vernier or fine adjustment for the arm. For the coarse adjustment of arm 26, there is furnished an aperture 45 which extends from the upper side of the top of the housing to a point short of the lower side. An aperture 46 extends from the aperture 45 on through to the lower side of the housing top, thereby forming a shoulder 47. A coarse adjusting tool 48 is provided, this tool having a shank portion 49 which is rotatably received by aperture 45. An extension 50 on shank 49 is adapted to extend through aperture 46 in the top side of the housing and into an elongated aperture 51 in the horizontally extending portion 27 of arm 26. It will be seen that the lower side of shank 49 abuts the shoulder 47 formed between apertures 45 and 46, thus limiting the downward extent to which the adjusting tool 48 can project.

From the above, it will be seen that rotation of the tool 48 causes arm 26 to move horizontally lengthwise of the housing such that the vertically extending portion 28 of the arm will be variably spaced from the right side 14 of the housing. Once the coarse adjustment is accomplished, stud bolts 39 and 40 are tightened to secure the horizontally extending portion of arm 26 thereto. Thereafter, bolt 43 may be rotated to cause flexure in the horizontally extending portion of the arm, thereby causing the free end of the vertically extending portion to move toward or away from the right side 14 of the housing. When the correct position is attained, nut 44 is tightened to lock the bolt 43 in position.

Referring now to FIGS. 1, 2, 3 and 6, there is provided a hollow coil bobbin having a central portion 52 and end portions 53 and 54, said coil bobbin being mounted on extension 29 of arm 26. It will be seen that the end portions 53 and 54 of the bobbin, which are rectangular in configuration, are prevented from lateral movement by means of ribs 30 and 31, and are prevented from vertical movement by boss 32. The coil is wound on the central portion 52 of the bobbin, said coil having reference numeral 55 applied thereto. The lead wires for the coil are provided with reference numeral 78 and are adapted to be suitably connected to the coil. These lead wires form the cable 76 which passes through slot 19 in boss 17 and through aperture 79 in the top side of the housing. A rubber pellet 80 fits within the slot 19 and aids in preventing chafing of the cable in the slot.

The core which is adapted to be associated with coil 55 is provided generally with reference numeral 56 and is seen to comprise legs 57 and 58 which are connected at their upper portions and slightly spaced apart at their lower extremities to form a non-magnetic gap 59. Gap 59 is preferably filled with a suitable non-magnetic material so as to form a structurally rigid connection between the lower ends of core legs 57 and 58. Leg 58 of the core is received by the hollow bobbin in a manner such that the core is freely movable vertically relative to the bobbin.

The means for supporting the core in relation to the coil includes a U-shaped element constructed of spring wire material which includes a base portion 60 and substantially horizontally extending arm portions 61 and 62. As shown specifically in FIG. 3, the lower end of the vertically extending portion 28 of arm 26 is provided with slots 63 and 64 which receives the portions of arms 61 and 62 near the point where they join the base portion 60. The vertically extending portion 28 of arm 26 is recessed between slots 63 and 64 so as to form a web portion 65. The base portion 60 of the U-shaped member is adapted to lie against web 65 and is provided with a U-shaped portion 66 centrally thereof which partially surrounds a rivet 69. A plate 67 is adapted to lie against the base portion 60 of the U-shaped portion and to be held thereagainst by the rivet 69. As shown in FIG. 1, there is provided a portion 68 extending at right angles to the plate 67 which tends to hold the coil and the bobbin upon which the coil is wound in position in the housing.

Figure 3:
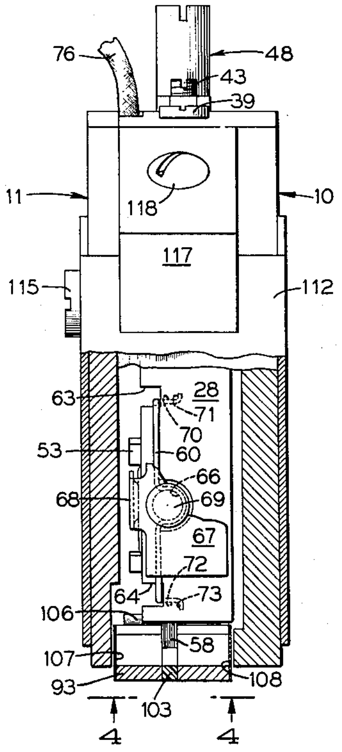
FIG. 3 is a cross-sectional view taken along lines 3—3 of FIG. 1.

Referring to FIG. 3, the free end of arm 61 of the U-shaped mounting member is provided with a horizontally extending portion 70 and a vertically extending portion 71. Arm 62 of the U-shaped member is provided with a horizontally extending portion 72 and a vertically extending portion 73. The horizontally extending portions 70 and 72 are adapted to be received by elongated apertures 74 and 75, respectively, in leg 57 of core 56. The vertically extending portions 71 and 73 serve to aid in holding the ends of arms 61 and 62 secured to the core leg.

As illustrated in FIG. 1, there is provided a spring 77 mounted so that one end thereof extends into a seat in boss 17 and the other end fits over a projection on the upper side of core 56. This spring tends to urge the core 56 downwardly.

The transducer assembly in the left half of the housing is not adjustable as was the transducer assembly just described. However, the assembly is much the same and will be described in general terms only. The coil and bobbin are generally referenced by numeral 81 and are held in position in the housing by ribs 23 and 24 and boss 25. The two legs of the core operatively associated with the coil are provided with reference numerals 82 and 83, leg 83 being adapted to extend through the hollow portion of the core bobbin. The U-shaped supporting member for the core is illustrated generally by reference numeral 84. In order to support this U-shaped member on the left side 13 of the housing, slots 85 and 86 are provided in the said left side. Also, a recess is formed between the slots leaving the web 87 against which the base of the supporting member 84 rests. To secure the supporting member in place, a relatively flat plate 88 is adapted to rest against the base of the supporting member and to be retained in this position by rivet 89. An extension 90 is provided on plate 88, said extension being approximately perpendicular to the plate and arranged to urge the coil and bobbin assembly 81 against the back of the housing.

A non-magnetic gap 91 is formed between legs 82 and 83 of the core in the left half of the housing, this gap being spaced from gap 59 in core 56. These gaps are adapted to be supported in substantially fixed spaced relation from the moving record medium 92 by means of a shoe member, illustrated generally by reference numeral 93, which is supported away from the record medium 92 by the laminar fluid boundary adhering thereto during the translation thereof.

The record medium is illustrated generally, by way of example only, as a drum having a magnetizable coating formed on the peripheral surface thereof. As shown, the drum may be mounted on a shaft 94 and driven from any suitable means such as the motor 95. It will be appreciated, however, that other forms of record media may be utilized with the present invention.

Referring to FIGS. 1 through 4, the shoe 93 is seen to comprise a bottom surface 96 which is adapted to conform to the surface of the record medium 92. A laterally extending somewhat V-shaped slot 97 is provided intermediate the ends of the shoe and is utilized for a reason to be explained hereinafter. An ear 98 is formed on the shoe to the left of slot 97. A slot 99 is provided in ear 98, said slot extending longitudinally of the shoe and from the top of the ear to the bottom of the shoe. Slot 99 is formed to accommodate the passage of the lower ends of legs 82 and 83 of the core therethrough. Leg 82 of the core is pivotally connected to ear 98 by way of a pivot pin 100, the arrangement being such that the lower end of gap 91 extends to a point even with the bottom surface 96 of the shoe.

At the time shoe 93 is constructed, a longitudinally extending slot is formed to the right of the laterally extending slot 97, this longitudinally extending slot extending from a point 101 all the way to the right end of the shoe. Thereafter, from the point 102 to the right end of the shoe, the slot may be filled with an insulating material illustrated by reference numeral 103 in FIG. 4. Thus, it will be seen that a longitudinal extending slot extending from point 101 to point 102 is formed to receive the lower ends of legs 57 and 58 of core 56. Surfaces 104 and 105 are formed on the upper side of the portion of the shoe immediately to the right of the laterally extending slot 97. A pin 106 is provided near the lower end of leg 57, said pin projecting perpendicularly from opposite sides of the core leg and positioned to rest on surfaces 104 and 105. The radius of curvature of surfaces 104 and 105 is such that as pin 106 is moved thereover between the opposite ends thereof during the adjustment of arm 26, the lower ends of core legs 57 and 58, and thereby the lower end of gap 59, will remain even with the surface 96 of the shoe.

Figure 4:
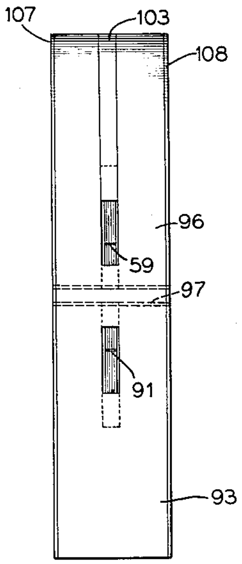
FIG. 4 is a bottom view taken along lines 4—4 of FIG. 3.
Figure 5:
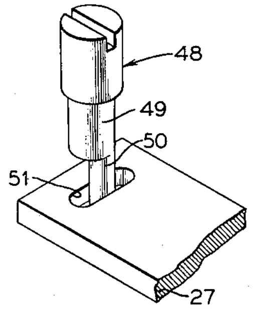
FIG. 5 is a fragmentary isometric view of the adjusting means for the arm which supports one of the transducer components.

As shown in FIGS. 2, 3 and 4, the sides of shoe 93 are covered by a thin sheet of insulating material to isolate the conductive shoe member from the conductive housing. The shoe is prevented from substantial lateral movement by plate 11 on one side and by a lip 109 on the back of housing 10 on the other side.

Referring to FIG. 1, the front plate 11 is furnished with a slot 110 which extends from the bottom thereof to a point short of the top. This slot is aligned with slot 16 in the housing 10. Slots 110 and 16 allow the sleeves 111 and 112, which are constructed of a suitable magnetic material, such as a ferromagnetic alloy having high permeability and low hysteresis loss in relatively low magnetizing fields, for example, to respectively surround the right and left halves of the assembly. Sleeve 111 is secured in position by a bolt 113 which is threadingly received by an aperture 114 in boss 20. Sleeve 112 is secured in position by a bolt 115 which is threadingly received by an aperture 116 in boss 17. The left and right halves of plate 11 are respectively secured to the housing 10 by the afore-mentioned bolts 113 and 115. It will be noted that the lower ends of the portions of sleeves 111 and 112 in slots 110 and 16 extend into the laterally extending slot 97 in shoe 93.

In assembling the various parts of the present invention, the coil and core assembly in the left half of the housing 10 is arranged in place. Thereafter, arm 26 with the coil and core assembly mounted thereon is mounted in the right half of housing 10. The front plate 11 is now placed in position slightly higher than its normal position so that the lower ends of the cores are in view below the lower end of the front plate. Bolts 113 and 115 are threaded into their respective apertures. The bolts are not fastened securely until sleeves 111 and 112 are slid over the left and right halves under the heads of the bolts 113 and 115, respectively. With the sleeves 111 and 112 moved upwardly to the limit of their movement, core 82 extends sufficiently below sleeve 111 to allow shoe 93 to be pivotally mounted on core 82 by pin 100. Thereafter, the sleeves are lowered to the proper point and the bolts 113 and 115 are tightened in place.

The entire assembly now may be mounted adjacent the record medium such that the surface 96 of shoe 93 abuts the surface 92 of the record medium. The shoe may be urged against the record medium by the spring 77, and a similar spring (not shown) in the left half of the housing, as well as by the U-shaped supporting elements which mount the cores in place. The force urging engagement of the shoe with the drum is designed to be less than the opposing force generated by the laminar air boundary which adheres to the surface 92 during rapid movement thereof so that the shoe can float on the laminar boundary. In mounting the assembly in position, the wings 126 and 117 on the housing 10 are adapted to be secured by suitable means, such as bolts 118 (only one of which is shown in FIG. 1), to the members 119 (only one of which is shown in FIG. 1) which are fixed relative to the axis of rotation of the magnetic drum.

If the surface 92 of the record medium is not moving, the shoe 93 will normally lie thereagainst. As motor 95 gets the drum up to speed, the laminar fluid boundary which adheres to surface 92 causes shoe 93 to be raised off surface 92 and to be slightly spaced therefrom. The only remaining step is to adjust the spacing of the non-magnetic gaps 59 and 91 in the two cores. A rough measurement of the spacing is made prior to the time the assembly is mounted adjacent to the drum. This is accomplished by slightly loosening bolts 39 and 40 and rotating the adjustment tool 48 until the spacing between the gaps is slightly less than will eventually be required. Tool 48 is removed at this time and bolts 39 and 40 are tightened. Now the nut 44 can be loosened and bolt 43 rotated until the gaps are properly spaced. That is, if nut 43 is rotated to apply a greater pressure to the horizontally extending portion 27 of arm 26, the said portion 27 will be caused to flex and in so doing cause the lower end of the vertically extending portion 28 to move toward the right side 14 of the housing, thus moving the gaps 59 and 91 further apart.

The vernier for fine adjustment just described is carried out after the assembly is mounted adjacent the record medium. The reason for this is that the precise spacing required is determined by the length of the information which it is desired to have revolved or recirculated. Furthermore, since the transducer assembly is actually to be used in conjunction with the record medium, it is better than the final adjustment be made in actual use.

A brief description of the operation of revolving or recirculating information will aid in understanding the use of the present invention as well as the manner in which the vernier adjustment of the non-magnetic gaps is made. Referring to FIG. 1, consider, for example, that the drum is rotating in a clockwise direction as shown, that the transducer assembly in the right half of the housing is for reading magnetic information from the record medium, and that the transducer in the left half of the housing is for writing magnetic information back on the record medium.

A magnetized pattern of information may be placed on the record medium 92 by supplying suitable input information through cable 120 to the write coil 81. This is normally accomplished under the control of a clock pulse obtained from another track of the record medium. Once the information to be recirculated is placed on the record medium, the output signals from wires 78 connected to the read coil may be connected to an amplifier whose output is supplied to a conventional write control circuit. The latter circuit also receives the clock pulses and determines the input to the write coil 81. This means that the information on the record medium which arrives under the read head is immediately written back on the record medium by the write head. The amount or length of the information which can be stored in this fashion, or, in other words, the delay between the two heads, is a function of the spacing of the non-magnetic gaps 59 and 91. By way of example, assuming a specific bit packing density of information on the record medium, the information being recirculated may be a word containing a specific number of information bits. In adjusting the spacing of the non-magnetic gaps 59 and 91, the arrangement should be such that the first bit read from the read head is written back on the record medium by the write head immediately adjacent the last information bit of the word so that the first and last bits will be spaced the same distance apart as other adjacent bits. It will be obvious that once a specific adjustment is made, it is possible to recirculate words of a lesser number of information bits. As is also well known in the art, automatic shift left or shift right operations may be accomplished by respectively shortening or lengthening the spacing of the non-magnetic gaps in increments of one or more information bits.

The vernier adjustment of the non-magnetic gap 59 relative to the non-magnetic gap 91 is accomplished with the aid of an oscilloscope. The adjustments of two magnetic heads relative to one another and the synchronizing thereof with the clock pulses generated by the sync track is well known in the art. However, by way of example, one way of accomplishing the adjustment is to first place a specific information word on the record medium by means of the write head. Then, using a dual sweep display oscilloscope, the two heads in the housing are used as read heads, each head supplying the information it reads to a separate display on the oscilloscope. An examination of the outputs from the two heads, as displayed by the oscilloscope, will make it apparent just how much delay exists between the two heads. Arm 26 in the housing is adjusted until the desired delay appears to exist. Next, the output from the head which is normally used to write on the record medium is disconnected from the oscilloscope and in its place the clock pulses are supplied. Arm 26 is again adjusted until the clock pulses are aligned with the information bits. At this time, the non-magnetic gaps are properly spaced for the particular number of bits desired.

As previously mentioned, difficulty is experienced in the form of cross-talk between two transducer assemblies so close together. This is particularly true where one of the transducers is utilized to write information and the other is utilized to read information at the same time. The cross-talk includes electrostatic, eddy current and magnetic effects emanating from each transducer. A number of features of the present invention reduces this cross-talk to a point where a good signal to noise ratio is obtained.

The housing for the transducer assembly, referred to by reference numerals 10 and 11, is constructed of a material, which is conductive but non-magnetic, such as copper, and serves to provide good electrostatic shielding for the electrical energy that is radiated whenever a voltage change occurs within the housing. An example of this type of voltage change is that caused across the coils and between the leads into the coils when alternating current is supplied. This shielding provides a low resistance source which absorbs the radiated energy. Because the housing almost completely surrounds the origin of the energy, the electrostatic shielding is very effective. The housing also absorbs radiated energy in the form of eddy currents.

The shoe 93 is constructed of a conductive material which is non-magnetic in nature such as Phosphor bronze. The lines of flux in the non-magnetic gaps cause eddy currents to be generated in the portions of the shoe surrounding the gaps. Since the shoe is constructed of a material which is a good electrical conductor, energy created by the eddy currents thus generated is dissipated in the form of heat. The eddy currents tend to remain adjacent the slots in the shoe and do not stray perceptibly therefrom so that good shielding is afforded. This shielding is enhanced by virtue of the insulation filled slot in the shoe which extends from point 102 all the way to the right end of the shoe. In this fashion, the eddy currents generated as a result of the lines of flux in a non-magnetic gap 91 formed in the write head are prevented from closing in the right hand portion of the shoe and thus combining with the eddy currents generated in the area of the shoe surrounding the non-magnetic gap and causing a deleterious effect on the read head.

Sleeves 111 and 112 which surround the two halves of the housing serve to shield the lines of flux emanating from the transducer components within each half from the transducer component in the other half. Since the shields are constructed of a magnetic material, such as a ferromagnetic alloy having high permeability and low hysteresis loss in relatively low magnetizing fields, the magnetic shielding effect is increased. Thus, a short low reluctance return path is supplied for the magnetic field before it reaches the read head.

Extension of the magnetic shield in the form of sleeves 111 and 112 allows the shields to intercept additional lines of flux that emanate from the coils or gaps, the effect, therefore, is one of increased magnetic shielding. Also, the paths of the eddy currents generated in the shoe are altered by the laterally extending slot in such a way as to increase the shielding. That is, the area at the cross-section of the shoe immediately beneath slot 97 has a higher electrical resistance than it would normally have without the slot, and the eddy currents take the path of least resistance which is away from the area beneath the slot. This shielding effect, therefore, tends to isolate the eddy currents which surround non-magnetic gaps 59 and 91. The two sleeves are insulated from each other where they are close together in slot 16 by a strip of pressure sensitive tape 127 so that eddy currents set up in one half of the housing do not circulate around the housing part for the read coil and as they change induce cross-talk signals. This also insures that there will be no single turn coil in effect coupling the read and write coils. In certain instances, only the magnetic sleeve around the write portion of the assembly may be required.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Revolver apparatus for simultaneously writing and reading manifestations of intelligence on a magnetic drum surface which is adapted to traverse rapidly a path closely adjacent said apparatus, there being a laminar fluid boundary which adheres to said surface as result of said rapid traversal, which comprises: a housing, said housing being constructed of a material having good electric conducting properties; first and second transducer components mounted relative to said housing, said housing affording electrostatic shielding between said transducer components; means for adjustably spacing said transducer components on said housing; a sleeve of magnetic material surrounding one of said transducer components for providing magnetic shielding therebetween; said transducer components including respectively first and second coil means fixed relative to said housing and first and second core means supported relative to said housing, each said core having a non-magnetic gap portion adjacent said surface; a shoe, said shoe having a first surface adjacent said drum surface and parallel therewith and a second surface above said first surface parallel with said drum surface, said shoe being of a conductive material and being supported by said laminar fluid boundary, said shoe having first and second slots therein receptive of said non-magnetic gap portions of said cores which are movable therein, one of said slots being cut longitudinally to the edge of said shoe to afford electromagnetic shielding between said gaps; a transverse slot in said shoe receptive of said shielding material to further aid in preventing electromagnetic interaction between said transducer components; said first core being pivotally connected to said shoe and said second core being movably supported by said shoe on said second parallel surface.

2. Revolver apparatus for simultaneously writing and reading manifestations of intelligence on a magnetic drum surface which is adapted to traverse rapidly a path closely adjacent said apparatus, there being a laminar fluid boundary which adheres to said surface as result of said rapid traversal, said apparatus comprising a housing having first and second coil means mounted therein having respectively first and second cores operatively associated therewith, electrostatic and magnetic shielding means between said coils, each of the cores having a non-magnetic gap therein for association with said magnetic drum surface, elongated shoe means of a conductive and non-magnetic material pivotally connected to said first core and arranged to support said second core so that the longitudinal spacing of said nonmagnetic gaps is adjustable without changing the relative spacing of said latter core and said magnetic drum surface; said shoe having a surface parallel with said drum surface and said second core being adapted to movably rest thereon; said shoe means being supported by said laminar fluid boundary and having first and second spaced apart longitudinally extending slots therein which respectively receive the portions of said first and second cores having said non-magnetic gaps therein, one of said slots extending to the edge of said shoe means so as to form a non-conducting space between the portions of said shoe means forming said one slot.

3. Magnetic transducer revolver apparatus for use with a magnetizable magnetic drum surface which is adapted to traverse rapidly a peripheral path closely adjacent said transducer apparatus, there being a laminar fluid boundary which adheres to said surface as result of said rapid traversal, said transducer apparatus being adapted to write and read simultaneously manifestations of intelligence on said magnetic drum surface, said apparatus comprising a housing, said housing being constructed of a material having good electrical conducting properties, first and second magnetic transducers spaced apart along said path, each transducer comprising coil means and a core having a non-magnetic gap therein operatively associated therewith, said housing having a slot therein between said first and second coil means and a sleeve constructed of a magnetic material surrounding each portion of said housing on the opposite sides of said slot, means mounting said first and second magnetic transducers in said housing so that the non-magnetic gaps in the cores are adjacent the end of said housing which is adapted to be adjacent said magnetic drum surface, the last named means including means for adjusting the core of said second transducer relative to the core of said first transducer along said path so that the non-magnetic gaps may be spaced apart varying distances longitudinally said path and shoe means having one surface which is adapted to conform to said magnetic drum surface, said shoe means being supported in substantially constant spaced relation to said magnetic drum surface by said laminar fluid boundary, means for supporting the cores of said first and second transducers on said shoe means so that the gaps therein lie adjacent said one surface of said shoe means, said shoe means having a second surface parallel to said magnetic drum surface, one of said transducer cores being movably supported by said second surface, said shoe means being pivotally supported by said other transducer core, said shoe means being constructed of a conductive material and having first and second spaced apart longitudinally extending slots therein which respectively receive the portions of said first and second cores in which said non-magnetic gaps are formed, one of said slots extending to the edge of said shoe means so as to form a non-conducting gap between the portions of said shoe means forming said one slot.

4. The combination of claim 3 in which the means mounting said first and second magnetic transducers in said housing includes an L-shaped bracket having one portion adjacent one side of said housing and the other portion adjacent the opposite side of the housing from the end adapted to be adjacent said magnetic drum surface, the core of said second transducer being mounted on the said one portion of said bracket, means for adjustably securing the other portion of said bracket to said opposite end of said housing so that said other portion is incapable of lateral movement with respect thereto.

5. The combination of claim 3 in which the means mounting said first and second magnetic transducers in said housing includes an L-shaped bracket having one portion adjacent one side of said housing and the other portion adjacent the opposite side of the housing from the end adapted to be adjacent said magnetic drum surface, the core of said second transducer being mounted on the said one portion of said bracket, means for adjustably securing the other portion of said bracket to said opposite end of said housing so that said other portion is incapable of lateral movement with respect thereto, and means for flexing the said other portion of said bracket for making the final adjustment of the position of the non-magnetic gap of said core in said second transducer.

References Cited in the file of this patent

UNITED STATES PATENTS

| | | |
|---|---|---|
| 2,530,584 | Pontius | Nov. 21, 1950 |
| 2,563,445 | Zenner | Aug. 7, 1951 |
| 2,563,850 | Lindsay | Aug. 14, 1951 |

(Other references on following page)

UNITED STATES PATENTS

| | | |
|---|---|---|
| 2,644,856 | Pettus | July 7, 1953 |
| 2,772,135 | Hollabaugh et al. | Nov. 27, 1956 |
| 2,827,355 | Lubkin | Mar. 18, 1958 |
| 2,862,781 | Baumeister | Dec. 2, 1958 |
| 2,863,004 | Maclay et al. | Dec. 2, 1958 |
| 2,905,933 | Canepa | Sept. 22, 1959 |
| 2,907,965 | Mercier | Oct. 6, 1959 |
| 2,950,354 | Hohnecker | Aug. 23, 1960 |
| 2,957,051 | Epstein et al. | Oct. 18, 1960 |

FOREIGN PATENTS

| | | |
|---|---|---|
| 351,516 | Great Britain | June 22, 1931 |
| 390,500 | Great Britain | Apr. 3, 1933 |
| 763,780 | Great Britain | Dec. 19, 1956 |

OTHER REFERENCES

Proceedings of the Eastern Joint Computer Conference, Dec. 10–12, 1956, New York, pp. 136–139 (by Welsh et al.).